United States Patent
Smith

(10) Patent No.: US 6,750,769 B1
(45) Date of Patent: Jun. 15, 2004

(54) METHOD AND APPARATUS FOR USING RFID TAGS TO DETERMINE THE POSITION OF AN OBJECT

(75) Inventor: Randall B. Smith, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/317,508

(22) Filed: Dec. 12, 2002

(51) Int. Cl.[7] .............................................. G08B 13/14
(52) U.S. Cl. .................. 340/572.1; 340/572.4; 340/686.1
(58) Field of Search ................. 340/572.1, 572.4, 340/686.1, 505, 506, 539.1, 539.13, 5.92, 10.1; 700/215, 226, 229; 701/23, 25, 207, 213; 342/357.09, 357.1; 455/456, 457, 562

(56) References Cited

U.S. PATENT DOCUMENTS

| | | | | |
|---|---|---|---|---|
| 4,247,767 A | * | 1/1981 | O'Brien et al. ............. | 250/221 |
| 6,347,229 B1 | * | 2/2002 | Zelmanovich et al. ... | 455/456.1 |
| 6,377,888 B1 | * | 4/2002 | Olch ........................ | 340/572.1 |
| 6,512,478 B1 | * | 1/2003 | Chien ........................ | 340/572.1 |
| 6,549,064 B2 | * | 4/2003 | Bandy et al. ............... | 327/536 |
| 6,600,418 B2 | * | 7/2003 | Francis et al. ........... | 340/572.1 |

* cited by examiner

*Primary Examiner*—Van T. Trieu
(74) *Attorney, Agent, or Firm*—Park, Vaughan & Fleming LLP

(57) ABSTRACT

One embodiment of the present invention provides a system that uses Radio Frequency Identification (RFID) tags to determine the position of an object. During operation, the system receives signals from an array of RFID tags at an RFID tag reader, wherein a mask of known size and shape is interposed between the array of RFID tags and the RFID tag reader, thereby obscuring signals from a subset of the RFID tags. Next, the system determines the position of the object by analyzing the pattern of obscured RFID tags, wherein the analysis is based on a known spatial relationship between the object, the mask and the array of RFID tags.

22 Claims, 4 Drawing Sheets

METHOD AND APPARATUS FOR USING RFID TAGS TO DETERMINE THE POSITION OF AN OBJECT

BACKGROUND

1. Field of the Invention

The present invention relates to systems for detecting the position of an object. More specifically, the present invention relates to a method and an apparatus for using Radio Frequency Identification (RFID) tags to determine the position of an object.

2. Related Art

Computers often need to know the position of an object in the physical world. For example, interacting with a computer system often involves moving a mouse, a trackball, or some other physical object. In addition to user interaction, there are many other contexts in which computers need to know the position of objects in the physical world. For example, logistics systems need to track the movements of goods through warehouses, and assembly robots need to determine the position of cars as they move down the assembly line. Applications of such knowledge are nearly countless, because knowing the position of objects is a fundamental requirement for interacting with the physical world.

One technique for determining the position of a physical object is to modify the object to so that it is able to track its own position, and to report its position through a wired or wireless connection. While this technique is useful for some applications, it is expensive to modify an object in this way. Moreover, the object must contain a power supply, such as a battery, which further increases bulk or tethers the object through a physical connection.

Another technique is to use a video camera to survey a scene, and to use object recognition software to identify and determine the location of objects within the scene. However, this technique is expensive and requires line of sight access to the camera.

Moreover, creating software that accurately detects objects is a daunting task because of hidden surfaces and similarities between objects. For example, in a warehouse containing boxes of similar size, if the camera cannot see the side of a particular box with distinguishing markings, the system cannot identify the particular box.

A relatively inexpensive technique for determining the position of an object in the physical world is to attach a Radio Frequency Identification (RFID) tag to the object. RFID tags are relatively small (some are smaller than a nickel), inexpensive, and do not require a power source. However, existing RFID tag readers cannot pinpoint the exact location of the object. Rather, they simply report the presence or absence of a tag in their field of sensitivity.

Hence, what is needed is a method and an apparatus for using RFID tags to determine the position of an object.

SUMMARY

One embodiment of the present invention provides a system that uses Radio Frequency Identification (RFID) tags to determine the position of an object. During operation, the system receives signals from an array of RFID tags at an RFID tag reader, wherein a mask of known size and shape is interposed between the array of RFID tags and the RFID tag reader, thereby obscuring signals from a subset of the RFID tags. Next, the system determines the position of the object by analyzing the pattern of obscured RFID tags, wherein the analysis is based on a known spatial relationship between the object, the mask and the array of RFID tags.

In a variation on this embodiment, the array of RFID tags resides at a fixed location and the mask of known size and shape is coupled to the object. In this way, when the physical object is interposed between the array of RFID tags and the RFID tag reader, the mask obscures the subset of RFID tags.

In a further variation on this embodiment, the object contains a separate RFID tag that facilitates in identifying the object.

In a variation on this embodiment, the mask of known size and shape resides at a fixed location and the array of RFID tags is coupled to the object. In this way, when the mask of known size and shape is interposed between the object and the RFID tag reader, a pattern on the mask obscures the subset of RFID tags.

In a further variation on this embodiment, identifiers received from RFID tags in the array of RFID tags facilitate in identifying the object.

In a variation on this embodiment, the system analyzes the pattern of obscured RFID tags to determine the orientation of the object.

In a variation on this embodiment, each RFID tag in the array of RFID tags is a passive, unpowered circuit that transmits a unique ID in response to an RF signal.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals-are modulated). For example, the transmission medium may include a communications network, such as the Internet.

System for Determining the Location of an Object with a Mask

Figure 1:
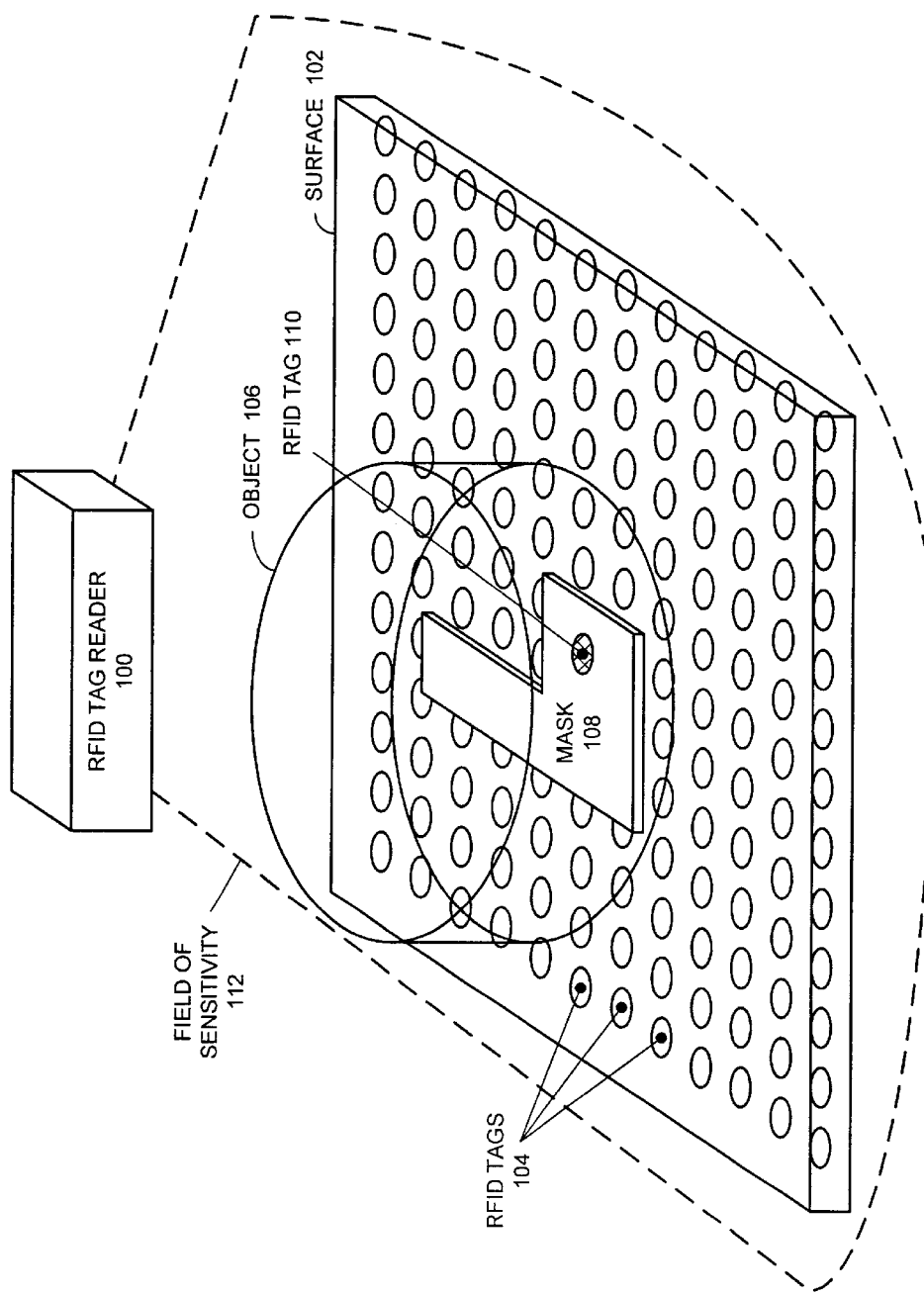
FIG. 1 illustrates a system for determining the location of an object using a mask in accordance with an embodiment of the present invention.

FIG. 1 illustrates a system for determining the location of object 106 with a mask 108 in accordance with an embodiment of the present invention. As is illustrated in FIG. 1, the system contains RFID tag reader 100 which has field of sensitivity 112. RFID tag reader 100 can read any RFID tag that is within field of sensitivity 112, provided that the signal from the RFID tag is not blocked by any intervening material or mask.

The system illustrated in FIG. 1 also contains surface 102 which is transparent to Radio Frequency (RF) signals. For example, surface 102 can include a tabletop or a floor. Embedded in or below surface 102 is an array of RFID tags 104. RFID tags in array of RFID tags 104 are arranged in a fixed pattern that is known to the system. Note that each RFID tag in the array of RFID tags 104 has a unique ID.

The system illustrated in FIG. 1 also contains object 106. Object 106 can include any object to be tracked by the system. For example, object 106 can be a box of parts moving through a warehouse.

Mask 108 and RFID tag 110 are attached to or contained within object 106. RFID tag 110 is unique to object 106 and identifies object 106 to the system. Once object 106 becomes known to the system, the system can determine the size and shape of mask 108. For example, in one embodiment, the size and shape of mask 108 is retrieved from a database using the ID from RFID tag 110.

Mask 108 is opaque to RF signals, and hence, blocks the RF signals from a subset of the array of RFID tags 104 from reaching RFID tag reader 100. By determining the pattern of the RF signals that are blocked from RFID tag reader 100, and comparing the pattern to the size and shape of mask 108, the system can determine the position of mask 108. Since mask 108 is attached to object 106, the system can also determine the position of object 106. In one embodiment of the present invention, the system can additionally determine the orientation of object 106, based upon how the shape of mask 108 obscures RFID tags 104.

Object with an Array of RFID Tags

Figure 2A:
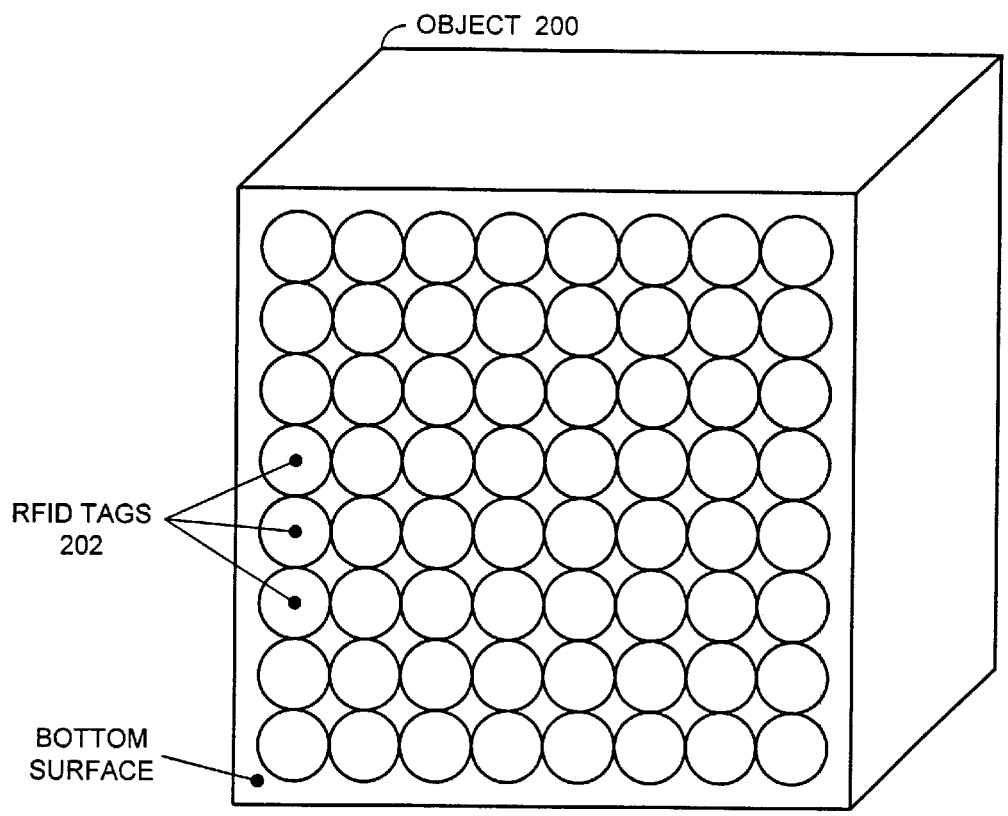
FIG. 2A illustrates an object with an array of Radio Frequency ID (RFID) tags in accordance with an embodiment of the present invention.

FIG. 2A illustrates object 200 with an array of Radio Frequency ID (RFID) tags 202 in accordance with another embodiment of the present invention. Object 200 contains an array of RFID tags 202 on its bottom surface. Note that RFID tags 202 can generally be placed on any surface of object 200, but have been placed on the bottom surface in this example. Each RFID tag in the array of RFID tags 202 contains a unique ID. These unique IDs serve to identify object 200. Moreover, signals received from the array of RFID tags 202 facilitate in determining the position of object 200 as illustrated in FIG. 2B.

System for Determining the Location of an Object

Figure 2B:
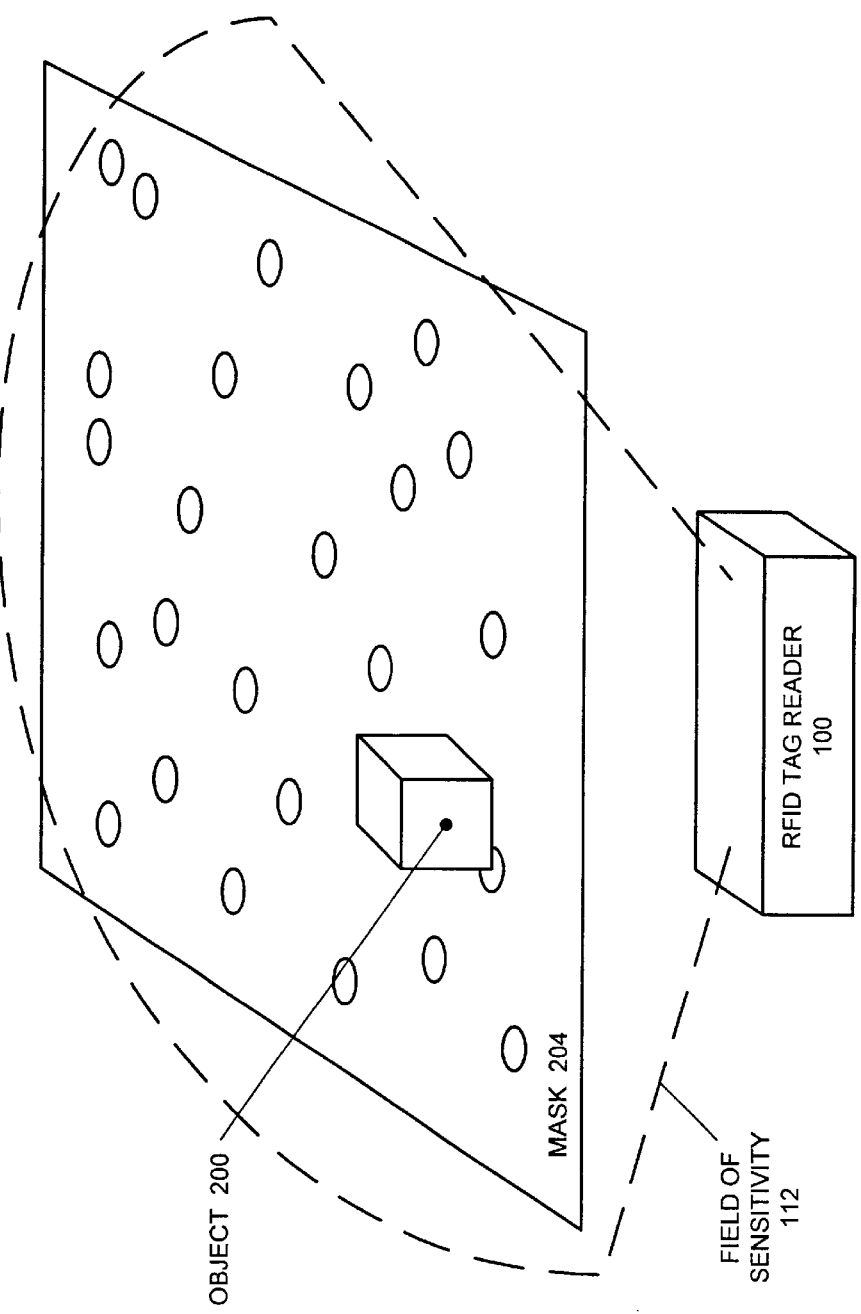
FIG. 2B illustrates a system for determining the location of an object with an array of RFID tags in accordance with an embodiment of the present invention.

FIG. 2B illustrates a system for determining the location of object 200 with an array of RFID tags 202 in accordance with an embodiment of the present invention. The system contains RFID tag reader 100 which has field of sensitivity 112. RFID tag reader 100 can read any RFID tag that is within field of sensitivity 112, provided that the signal from the RFID tag is not blocked by any intervening material or mask.

The system also contains mask 204, which is located between object 200 and RFID tag reader 100. Mask 204 is opaque to RF signals, but contains a pattern of holes that allow signals from RFID tags close to the holes to pass through mask 204.

When object 200 moves across mask 204, the signals from certain RFID tags from the array of RFID tags 202 reach RFID tag reader 100. By analyzing the pattern of RFID tags from RFID tags 202 that are visible to RFID tag reader 100, the system can determine the position of object 200. Note that in one embodiment of the present invention, the system can also determine the orientation of object 200.

Process of Determining the Location of an Object

Figure 3:
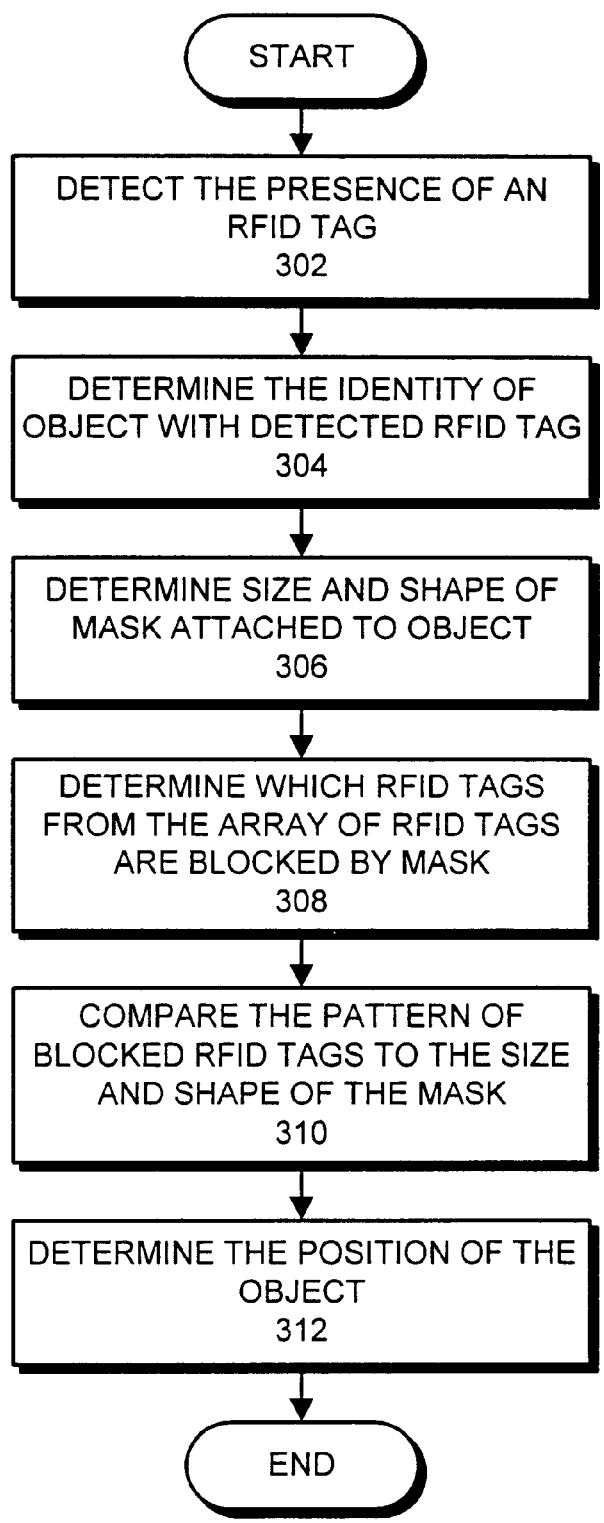
FIG. 3 presents a flowchart illustrating the process of determining the location of an object in accordance with an embodiment of the present invention.

FIG. 3 presents a flowchart illustrating the process of determining the location of an object in accordance with an embodiment of the present invention. The system starts when the presence of RFID tag 110 is detected by RFID tag reader 100 (step 302). Once the presence of RFID tag 110 is detected, the system determines the identity of object 106 from RFID tag 110 (step 304). In one embodiment of the present invention, this information is stored in a database attached to the system. At this time, the system also determines the size and shape of mask 108 that is attached to object 106 (step 306).

Once the identity of object 106 and the size and shape of mask 108 have been determined, the system determines which signals from the array of RFID tags 104 are blocked by mask 108 (step 308). The system then compares the pattern of blocked RFID tags to the size and shape of mask 108 (step 310) and from this comparison, determines the position of object 106 (step 312). Note that the system can additionally determine the orientation of object 106.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using Radio Frequency ID (RFID) tags to determine the position of an object, comprising:
   receiving RF signals from an array of RFID tags at a RFID tag reader, wherein a mask of known size and shape blocks RF signals from a subset of the array of RFID tags, so that the RF signals from the subset of RFID tags do not reach the RFID tag reader;
   determining a pattern of obscured RFID tags in the array of RFID tags; and
   analyzing the pattern of obscured RFID tags to determine the position of the object, wherein the analysis is based on a known spatial relationship between the object, the mask and the array of RFID tags.

2. The method of claim 1,
   wherein the array of RFID tags resides at a fixed location and the mask of known size and shape is coupled to the object; and
   wherein the physical object is interposed between the array of RFID tags and the RFID tag reader so that the mask obscures the subset of RFID tags.

3. The method of claim 2, wherein the object contains a separate RFID tag that facilitates identifying the object.

4. The method of claim 1,
   wherein the mask of known size and shape resides at a fixed location and the array of RFID tags is coupled to the object; and wherein the mask of known size and shape is interposed between the object and the RFID tag reader so that a pattern on the mask obscures the subset of RFID tags.

5. The method of claim 4, wherein identifiers received from RFID tags in the array of RFID tags facilitate in identifying the object.

6. The method of claim 1, wherein analyzing the pattern of obscured RFID tags further involves determining the orientation of the object.

7. The method of claim 1, wherein each RFID tag in the array of RFID tags is a passive, unpowered circuit that transmits a unique ID in response to an RF signal.

8. A computer-readable storage medium storing instructions that when executed by a computer cause the computer to perform a method for using Radio Frequency ID (RFID) tags to determine the position of an object, the method comprising:

receiving RF signals from an array of RFID tags at a RFID tag reader, wherein a mask of known size and shape blocks RF signals from a subset of the array of RFID tags, so that the RF signals from the subset of RFID tags do not reach the RFID tag reader;

determining a pattern of obscured RFID tags in the array of RFID tags; and analyzing the pattern of obscured RFID tags to determine the position of the object, wherein the analysis is based on a known spatial relationship between the object, the mask and the array of RFID tags.

9. The computer-readable storage medium of claim 8, wherein the array of RFID tags resides at a fixed location and the mask of known size and shape is coupled to the object; and wherein the physical object is interposed between the array of RFID tags and the RFID tag reader so that the mask obscures the subset of RFID tags.

10. The computer-readable storage medium of claim 9, wherein the object contains a separate RFID tag that facilitates identifying the object.

11. The computer-readable storage medium of claim 8, wherein the mask of known size and shape resides at a fixed location and the array of RFID tags is coupled to the object; and wherein the mask of known size and shape is interposed between the object and the RFID tag reader so that a pattern on the mask obscures the subset of RFID tags.

12. The computer-readable storage medium of claim 11, wherein identifiers received from RFID tags in the array of RFID tags facilitate in identifying the object.

13. The computer-readable storage medium of claim 8, wherein analyzing the pattern of obscured RFID tags further involves determining the orientation of the object.

14. The computer-readable storage medium of claim 8, wherein each RFID tag in the array of RFID tags is a passive, unpowered circuit that transmits a unique ID in response to an RF signal.

15. An apparatus for using Radio Frequency ID (RFID) tags to determine the position of an object, comprising:

a receiving mechanism configured to receive RF signals from an array of RFID tags at a RFID tag reader, wherein a mask of known size and shape blocks RF signals from a subset of the array of RFID tags, so that the RF signals from the subset of RFID tags do not reach the RFID tag reader;

a determination mechanism configured to determine a pattern of obscured RFID tags in the array of RFID tags; and an analysis mechanism configured to analyze the pattern of obscured RFID tags to determine the position of the object, wherein the analysis is based on a known spatial relationship between the object, the mask and the array of RFID tags.

16. The apparatus of claim 15, wherein the array of RFID tags resides at a fixed location and the mask of known size and shape is coupled to the object; and wherein the physical object is interposed between the array of RFID tags and the RFID tag reader so that the mask obscures the subset of RFID tags.

17. The apparatus of claim 16, wherein the object contains a separate RFID tag that facilitates identifying the object.

18. The apparatus of claim 15, wherein the mask of known size and shape resides at a fixed location and the array of RFID tags is coupled to the object; and wherein the mask of known size and shape is interposed between the object and the RFID tag reader so that a pattern on the mask obscures the subset of RFID tags.

19. The apparatus of claim 18, wherein identifiers received from RFID tags in the array of RFID tags facilitate in identifying the object.

20. The apparatus of claim 15, wherein the analysis mechanism is further configured to determine the orientation of the object.

21. The apparatus of claim 15, wherein each RFID tag in the array of RFID tags is a passive, unpowered circuit that transmits a unique ID in response to an RF signal.

22. A means for using Radio Frequency ID (RFID) tags to determine the position of an object, comprising:

a receiving means for receiving RF signals from an array of RFID tags at a RFID tag reader, wherein a mask of known size and shape blocks RF signals from a subset of the array of RFID tags, so-that the RF signals from the subset of RFID tags does not reach the RFID tag reader;

a determination means for determining a pattern of obscured RFID tags in the array of RFID tags; and an analysis means for analyzing the pattern of obscured RFID tags to determine the position of the object, wherein the analysis is based on a known spatial relationship between the object, the mask and the array of RFID tags.

* * * * *